United States Patent [19]

Colangelo

[11] Patent Number: 4,919,989
[45] Date of Patent: Apr. 24, 1990

[54] ARTICLE FOR SEALING WELL CASTINGS IN THE EARTH

[75] Inventor: Robert V. Colangelo, Chicago, Ill.
[73] Assignee: American Colloid Company, Arlington Heights, Ill.
[21] Appl. No.: 335,808
[22] Filed: Apr. 10, 1989
[51] Int. Cl.$^5$ ............................................. E21B 43/00
[52] U.S. Cl. ..................................... 428/65; 428/131; 166/180
[58] Field of Search .................... 166/180; 428/65, 131

[56] References Cited
U.S. PATENT DOCUMENTS
4,669,536 6/1987 Ames et al. ........................... 166/72

*Primary Examiner*—Alexander S. Thomas
*Attorney, Agent, or Firm*—Marshall, O'Toole, Gerstein, Murray & Bicknell

[57] ABSTRACT

An article for sealing boreholes in the earth and particularly around well casings extending into boreholes in the earth comprises the placement of a plurality of discrete, liquid-absorbing annular sealing elements or disks formed of relatively dry, solid, particulate or granular liquid-swellable clay meterial, such as bentonite, or bentonite clay which swells in size upon contact with and absorption of liquid encountered in the borehole. The elements are characterized by a disk-like planar shape having parallel, flat opposing faces and a central hole slightly larger in diameter than the cross-section of a well casing when present in a borehole. The disks are placed successively on the well casing and move down into the borehole until a stack of disks of the desired height is formed to substantially fill the space or void between the well casing and the borehole wall. When liquid comes in contact with the disk in a stack, the particulate material of the disks begins to swell and enlarge to completely fill the borehole or the space between the well casing and the borehole wall to provide a liquid-tight seal around the well casing within the borehole.

22 Claims, 6 Drawing Sheets

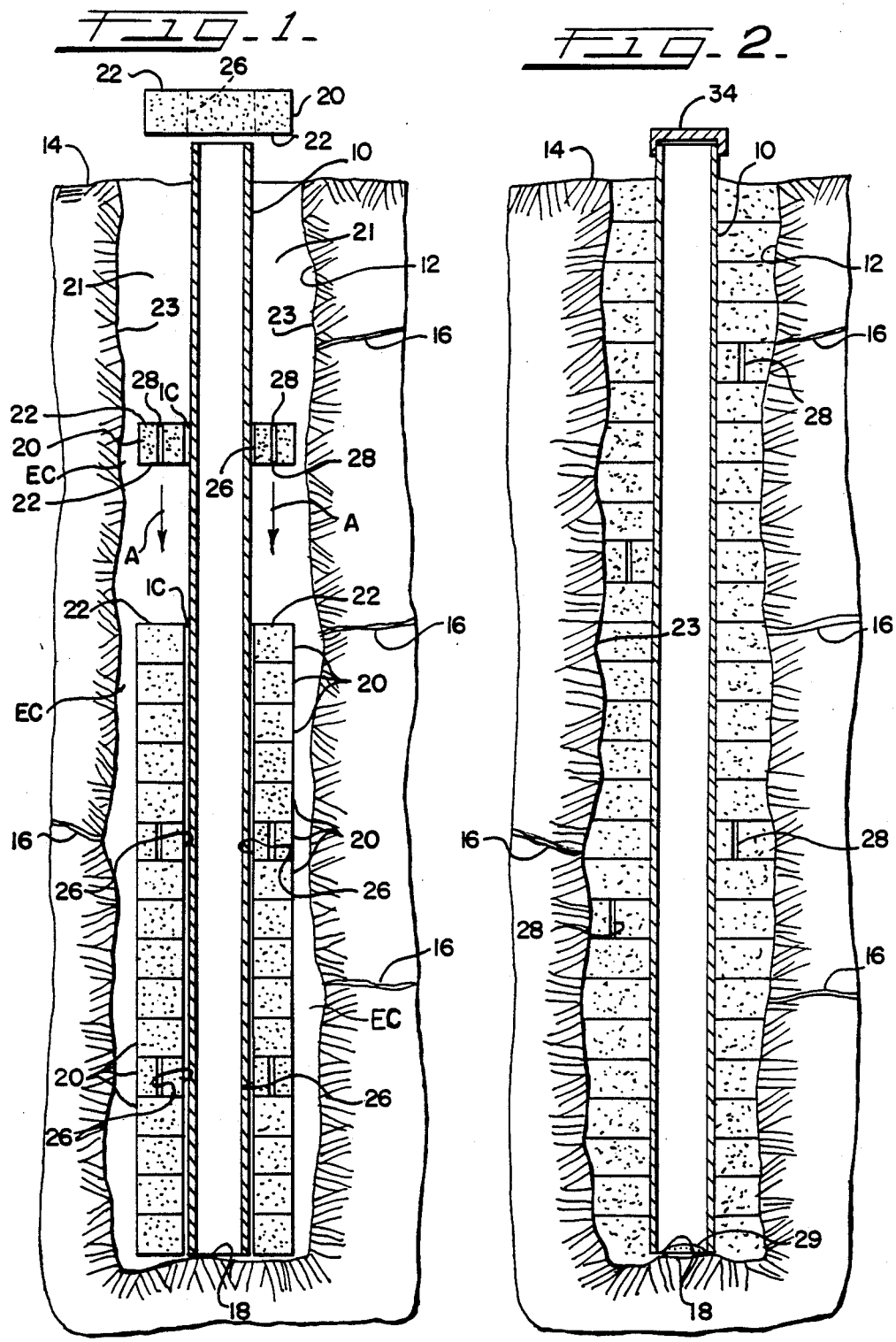

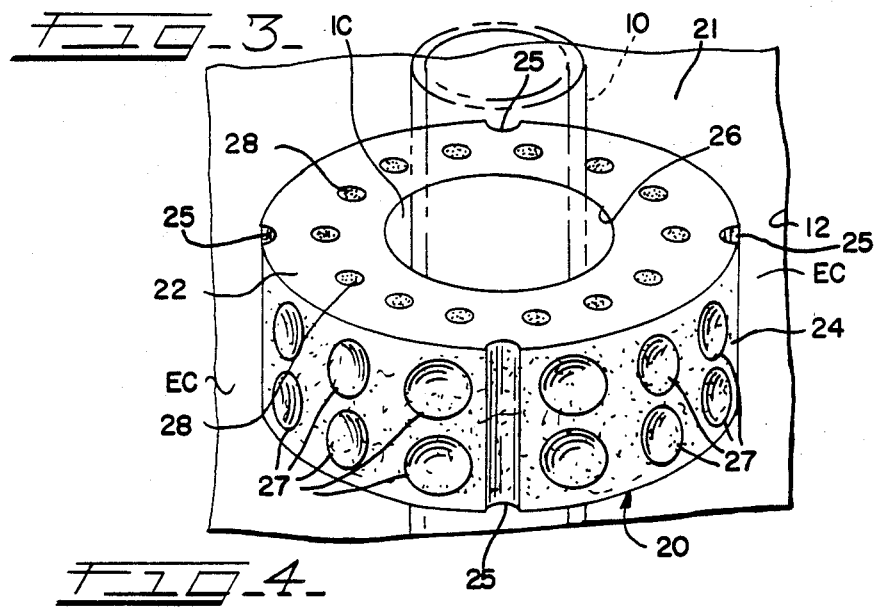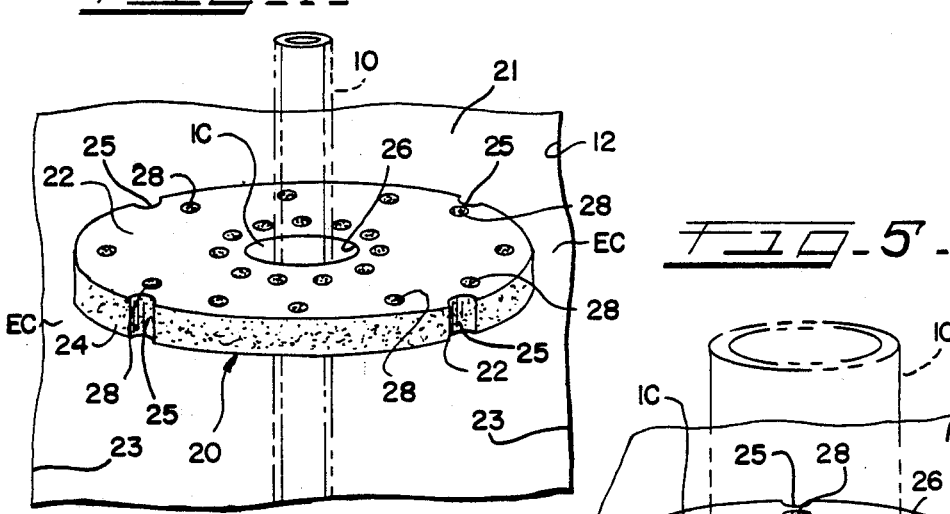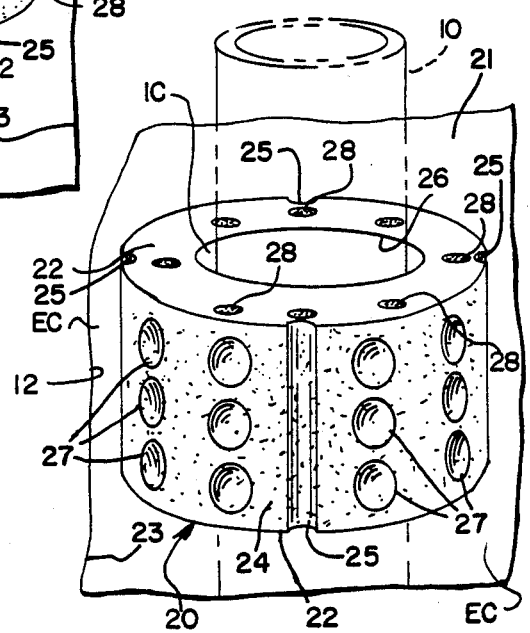

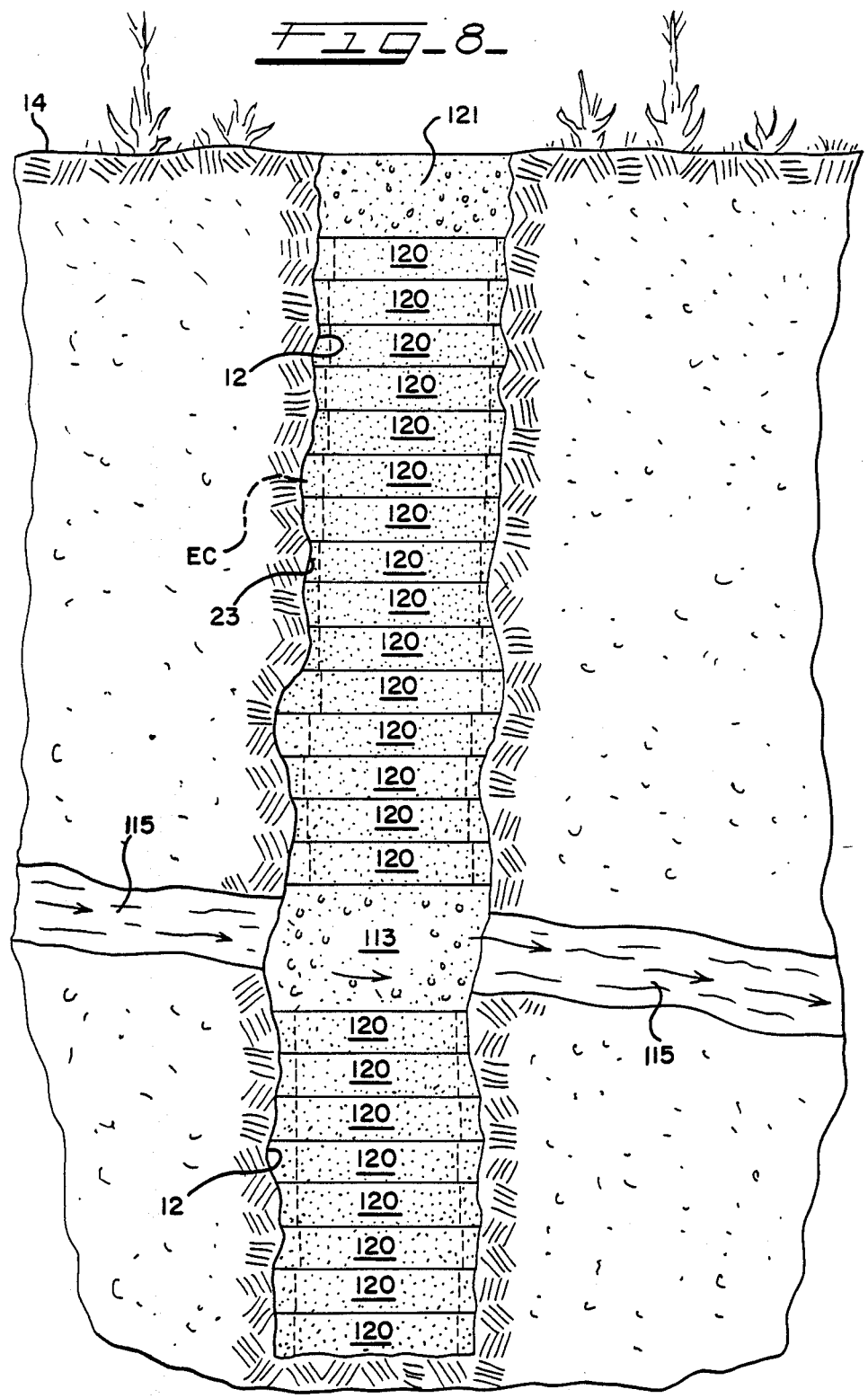

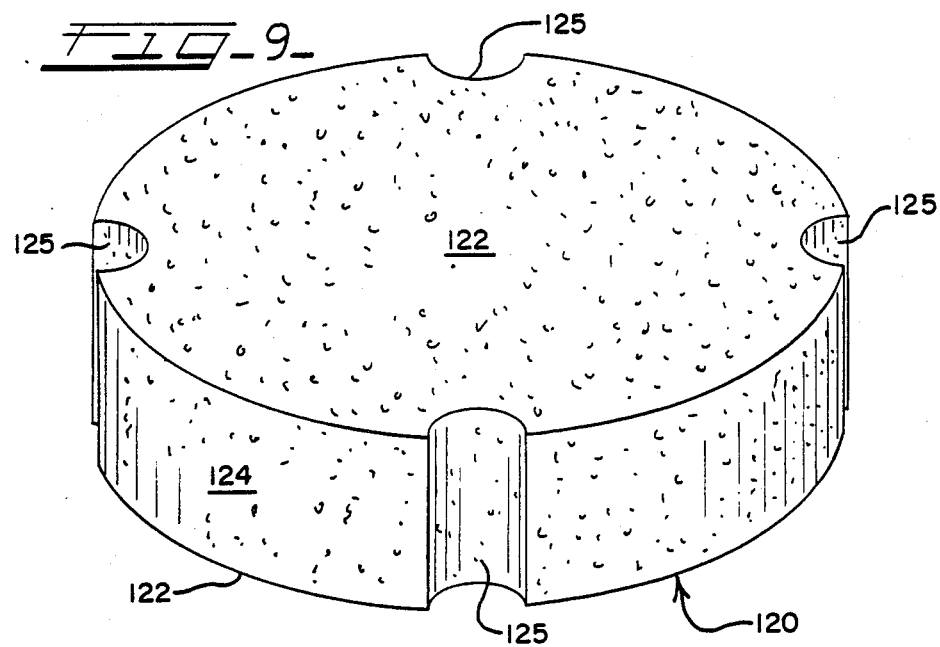
FIG-9-
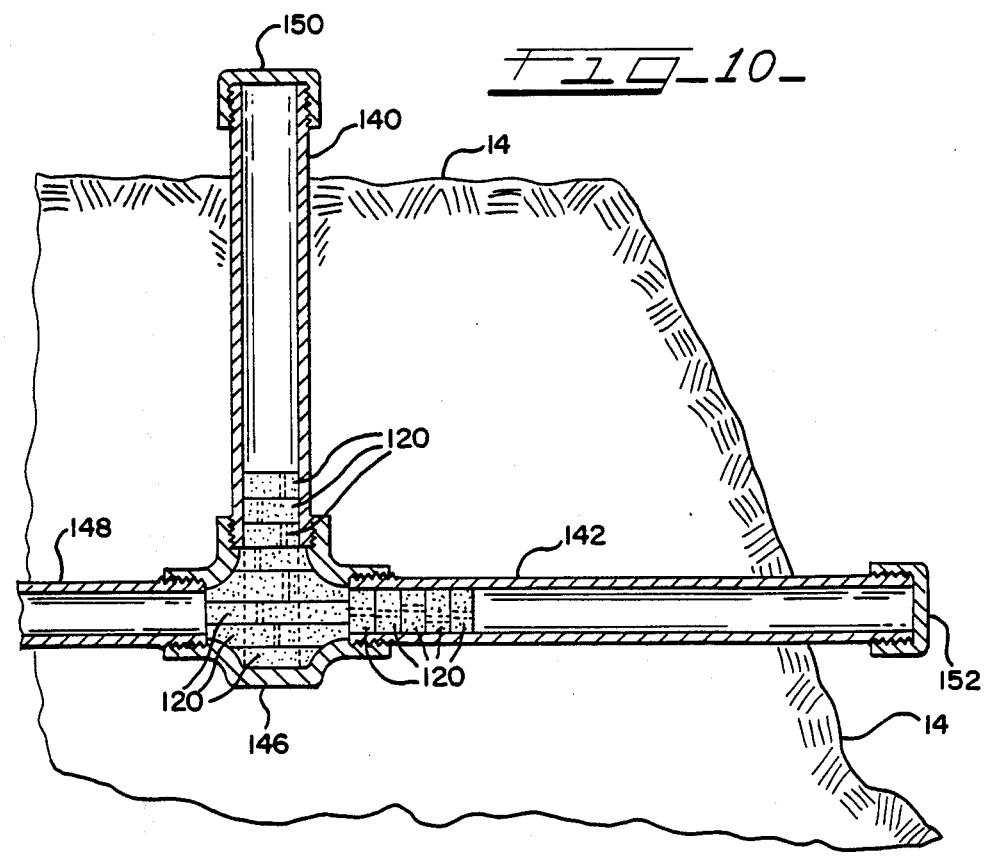
FIG-10-

ARTICLE FOR SEALING WELL CASTINGS IN THE EARTH

BACKGROUND OF THE INVENTION

1. Field of the Invention

The present invention relates to a new and improved article for sealing boreholes in the earth and more specifically, for sealing around the outside of an elongated well casing extending into a larger diameter borehole in the earth. The present invention is concerned with sealing off dry or dormant wells such as water and oil wells and in addition, is used for sealing off casings extended into a borehole against the entry of moisture or other unwanted liquids so that instrumentation may be contained within the well casing and can be maintained in a liquid-free environment. The invention is particularly useful with ground water monitoring wells and is also concerned with sealing around an elongated well casing extending into a borehole at particular selected levels in the borehole to provide one or more zones in the borehole that are free from the entry of unwanted liquid seeping into the borehole from the earth's strata immediately adjacent thereto. The invention is also concerned with conserving the life and longevity of well casings in wells which may be kept dormant for long periods of time in order to prevent corrosion and deterioration of the well casing so that when the wells are uncapped, normal operation and production can proceed without delay. Moreover, the invention is also useful in establishing seals and plugs in undergound piping.

2. Description of the Prior Art

In the past, many well casings extending into oil well boreholes have been capped off and the wells left dormat in view of the decline in oil prices. Water wells have often been capped off because of the entry of unwanted salt water or other liquids into the well casing or borehole from above or from various levels in the borehole. In particular, hollow well casings may be used for monitoring the level of the water table in the surrounding earth. This type of application requires a liquid-free environment in the well casing at least at certain levels or level ranges in the borehole so that instrumentation can be utilized for monitoring the precise level of the water table in the earth. Sealing around well casings in boreholes has previously been attempted by introducing a liquid-swellable material, such as granular bentonite in small pellet form, around the well casing. When the pellets encounter liquids, they swell up in size, however, because the pellets are free-flowing when in a dry condition, it is difficult to control the loss of pellets which tend to flow freely out into voids in the strata around the borehole. This loss of material is costly and in many instances, sealing around the well casing is unsatisfactory because the level of the pellets in a borehole is difficult to control and, thus, establishing a sealed zone around a well casing in the borehole at a particular strata level is very difficult to obtain with any precision when free-flowing pelletized material is used.

U.S. Pat. No. 4,669,536, issued Jun. 2, 1987, discloses the use of an elongated, cylindrically shaped, bentonite slug which is placed on a PVC casing within a borehole to prevent ground water contamination in a ground water monitoring system. Because of the elongated shape of the slug, difficulty may be encountered in moving the slug downwardly to the proper depth on a PVC casing, particularly if the casing is bent out of line along its length. Moreover, because of the elongated shape of the slug, difficulty may be encountered in fully sealing off borehole wall sections which are irregular in shape or which have large crevices. Because of the elongated body, the slug may require a considerable time period in order to become fully wetted by fluids in the borehole, so that adequate expansion to effect a seal will take too long or be incomplete. Additionally, because of the elongated shape of the slug, when liquid is encountered, the slug may expand inwardly with such force at an intermediate level thereof so as to constrict or collapse the PVC casing it surrounds.

OBJECTS OF THE PRESENT INVENTION

It is an object of the present invention to provide a new and improved article for sealing around the outside of an elongated well casing extending into a borehole in the earth.

More particularly, it is an object of the present invention to provide a new and improved article of the character described which is especially effective in sealing around elongated casings at certain predetermined levels or zones in a borehole and with greater accuracy than has been achievable in the past with small pellets and the like which flow freely into the borehole and into open crevices in the surrounding earth.

Still another of the present invention is to provide a new and improved article for sealing around a casing extended into a borehole so that the casing is better protected against unrestricted contact with water and other liquids seeping into the borehole.

Another object of the present invention is to provide a new and improved article for sealing around casings extending into boreholes which is extremely efficient, easy to install and use, and which is long lasting and permanent in nature.

Yet another object of the present invention is to provide a new and improved article of the character described which is relatively inexpensive and which is especially cost effective for sealing around and protecting steel well casings extending into boreholes in the earth.

Another object of the present invention is to provide a new and improved article for sealing around a well casing in a borehole which is fast acting yet safe, in that the chances of constricting or collapsing the well casing because of excessive, radially inwardly directed forces are minimized.

Still another object of the present invention is to provide a new and improved liquid sealing disk for use in forming a stack of disks around a well casing in a borehole to effect a liquid tight seal around the well casing at a desired level in the borehole.

Yet another object of the present invention is to provide a new and improved sealing disk of the character described which will rapidly swell to a maximum size of approximately its original volume in a period of 15 minutes or less up to an hour.

Another object of the invention is to provide a new and improved article for sealing around ground water monitoring wells.

Still another object of the present invention is to provide a new and improved article for plugging abandoned ground wells and for sealing and plugging underground piping and conduits.

BRIEF SUMMARY OF THE INVENTION

In one embodiment, the foregoing and other objects of the present invention are accomplished in a new and improved article for sealing around the outside or exterior surface of an elongated well casing extending into a larger borehole in the earth. In accordance with the method of the invention, a plurality of liquid-swellable, water-insoluble, discrete, annular sealing disks are formed out of a relatively dry, liquid-swellable, solid or particulate material made up of individual particles that swell in size upon contact with and absorption of liquid encountered in a borehole. The solid or particulate material is pressed under substantial pressure to form a structurally stable, annular shape having a pair of opposite, flat faces and a central bore or hole which is slightly larger than the outer diameter of a well casing on which the disk is mounted to descend or slide down into a borehole. The disk-shaped sealing elements are successively placed on the upper end of a well casing and are allowed to drop or fall downwardly into the borehole until a stack of sealing elements of the desired height is formed substantially filling the space between the well casing and the surrounding wall of the borehole. After a stack of disks is in place, any liquid seeping into the borehole and contacting the liquid-swellable, material of the disks, causes the disks to expand in a radial direction and fully seal off the void or previously existing space between the outside surface of the metal well casing and the adjacent wall surface of the earth in the surrounding borehole.

The sealing elements are formed of solid bentonite clay or granular bentonite having particles bonded together in a relatively dry condition (10% to 30% moisture) by the application of high pressure. When the sealing disks are to be used in connection with petroleum wells, the bentonite material is first treated with a polyquaternary amine, or other known materials, to become organophillic so that the disks are adapted to absorb and swell upon contact with any organic fluids which are likely to be encountered in the borehole. Treatment of bentonite with a polyquaternary amine to make the bentonite clay swellable upon contact with an organic liquid can be accomplished in the same manner as discussed for treatment of acrylate polymers described in this assignee's Pat. No. 4,755,562, which patent is hereby incorporated by reference. In addition, the sealing disks may include a mixture of materials such as calcium, sodium and or lithium bentonite, and a non-absorbent filler. Such fillers may comprise silica sand, mica, diatomaceous earth, and the like, and the sealing elements or disks may also include calcium stearate.

BRIEF DESCRIPTION OF THE DRAWING

For a better understanding the present invention, reference should be had to the following detailed description when taken in conjunction with the drawings, in which:

FIG. 1 is a vertical cross-sectional view illustrating a well casing extended into a larger diameter surrounding borehole in the earth and showing a stack of liquid-swellable, sealing elements or disks as they are introduced to fill the space around the well casing within the borehole for eventually sealing off the well casing when liquids are encountered;

FIG. 2 illustrates the casing and borehole of FIG. 1 after the borehole is filled with sealing elements or disks in accordance with the present invention and after the disks have swelled up or become enlarged in size to substantially completely fill the space or voids between the exterior surface of the well casing and the adjacent surface of the surrounding borehole;

FIG. 3 is an enlarged perspective view of an annular sealing element or disk in accordance with the present invention for use with a well casing which is relatively large in diameter in comparison to the diameter of the borehole into which the casing is extended;

FIG. 4 is a similar, perspective view of a fluid swellable sealing element or disk in accordance with the present invention and designed for use with a relatively small diameter well casing located in a relatively large diameter borehole;

FIG. 5 is a similar perspective view of an annular fluid-swellable, sealing element or disk in accordance with the invention designed for use with a well casing having a diameter that is substantially large in comparison to the diameter of the surrounding borehole;

FIG. 8 is a verticle cross-sectional view of an abandoned well or borehole which is plugged and sealed in accordance with the present invention to prevent a change of course of ground water flowing into the borehole;

FIG. 9 is an enlarged perspective view of yet another embodiment of annular sealing disk or well plugging element in accordance with the features of the present invention; and FIG. 10 is a vertical cross-sectional view of an underground piping system which has been plugged and sealed by utilizing sealing disks of the type illustrated in FIG. 9 in accordance with the features of the present invention.

DETAILED DESCRIPTION OF PREFERRED EMBODIMENTS OF THE PRESENT INVENTION

Figure 6:
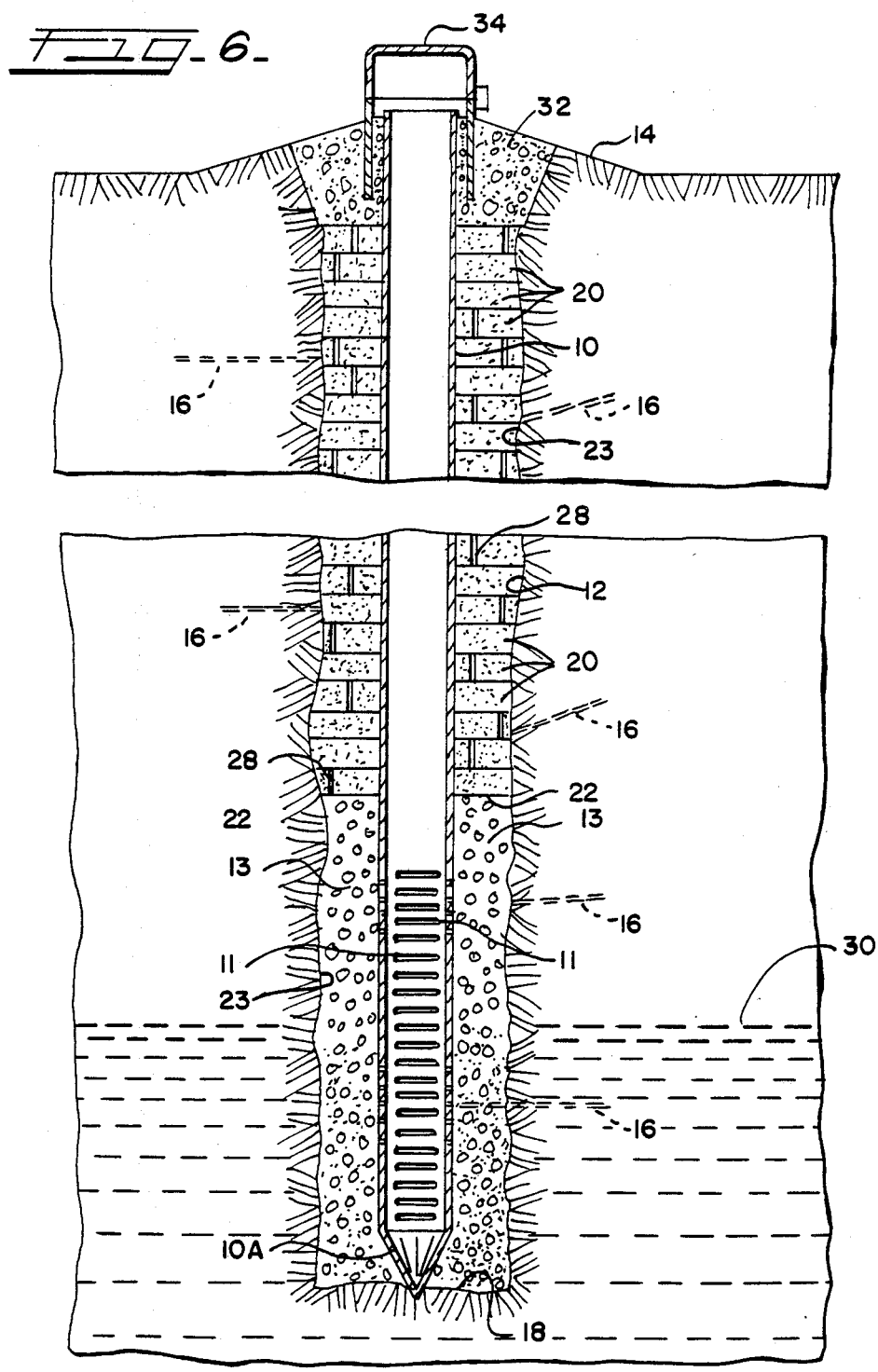
FIG. 6 is a vertical cross-sectional view of a capped-off well casing in a borehole utilized for sensing and determining the level of a water table in the surrounding earth of strata formation.

Referring now more particularly to the drawings, and in particular to FIGS. 1 and 2, therein is illustrated a typical oil or water well having an elongated steel casing 10 extending downwardly along the center of a borehole 12. The borehole extends downwardly from an upper surface 14 of the surrounding earth, and at various levels in the earth or strata below the surface 14, breaks in strata, voids, or changes in earth structure are commonly encountered as indicated by the numeral 16. Often from such regions 16, liquids such as water, organic liquid and/or petroleum tends to seep or flow into the borehole 12 sometimes on an intermittent basis.

Copending U.S. patent application Ser. No. 095,638, filed Sept. 14, 1987, and incorporated herein by reference discloses a composition and method of controlling lost circulation from wellbores during the drilling of a well by the use of pelletized bentonite clay intermixed with the drilling mud.

It is often desirable to establish a liquid-tight seal around the exterior surface of the steel casing 10 within the surrounding, larger diameter borehole 12 in order to prevent water and other liquids from the earth's strata or from the surface 14 from flowing in and filling up the borehole around the well casing. Also, if sufficient subgerranean pressures exist, liquids may flow upwardly from lower levels in the borehole and overflow onto the surface of the earth 14 which may be undesirable. In addition, it is desirable to minimize the area of contact of these liquids (which are sometimes corrosive in nature) with the outer surface of the well casing 10 so that the casing can remain sealed-off within the borehole 12 for long periods of time without substantial corrosive effects or rust. The elongated, steel well casing 10 may have an open lower end formed with a well point (10A—FIG. 6) or may simply rest upon a bottom surface 18 at the lower end of the borehole 12.

In accordance with the present invention, there are provided a plurality of annular sealing elements or disks indicated by the reference numeral 20 having a flattened out, donut-shape and initially formed of relatively dry, solid bentonite clay and/or granular or particulate, water-insoluble, water-swellable bentonite material. The solid material, particulate material or granules are pressed together under substantial pressure (as much as 20 tons per square inch) to provide a stabilized form of annular sealing element or disk 20 adapted for substantially filling a space or void 21 around the exterior surface of the steel well casing 10 and the irregular surrounding surface of the earth 23 within the borehole 12.

Referring momentarily to FIG. 3, each annular sealing disk 20 has a pair of flat, parallel upper and lower, annular surfaces 22 defined by a circular or cylindrical outer periphery 24 and has a central hole or bore 26 dimensioned to be slightly larger in diameter than the outer diameter of the well casing 10 with which the sealing disks are to used. The outer diameter of the circular periphery 24 of the disks 20 is chosen to be slightly less than the minimum diameter likely to be encountered in the borehole 12.

The solid bentonite clay and/or granulated or particulate bentonite clay material of the sealing disks 20 permits moisture and liquid to penetrate into the interior or the disk and to there be absorbed and contained by the liquid-swellable clay. For the purpose of facilitating the absorption of moisture, each disk 20 is provided with a plurality of through passages or openings 28 extending between the flat upper and lower surfaces 22 and spaced outwardly of the central hole 26 and parallel thereto. These passages are effective to help conduct moisture and liquids to contact the absorptive materials in the body of the sealing elements 20.

The disks 20 may also be provided with passages or grooves 25 spaced equilaterally around the peripheral surface 24 to further facilitate moisture absorption and movement of the disks downwardly along the well casing 10 into the borehole 12. In addition, the exterior perimeter surface 24 may be formed with a plurality of dimples 27 to further aid in conducting moisture inwardly into the body of the liquid-swellable material of the sealing elements 20.

Preferably, the central bore 26, the passages 28, the grooves 25 and the dimples 27 are formed by a molding process in a mold 50 of the type shown in FIG. 7 and described in detail hereinafter. During the molding process, the liquid-swellable material normally contains 10% to 30% moisture to provide for easier molding and for better durability of the disks 20 after molding is completed during shipment, storage and usage. When the liquid-swellable material has a low moisture content of approximately 10%, higher molding pressures in the range of 30, 50 or 70 tons per square inch are used whereas if the moisture content is in a higher range of 15% to 20%, approximately 20 tons per square inch as a maximum will provide the disks 20 with good durability characteristics after molding is completed. When the liquid-swellable material that is used comprises crude bentonite clay that has not been ground up or is not in granular form, a moisture content in the range of 30% to 40% is often encountered and, in this case, somewhat lower molding pressures can be utilized in forming the sealing disks 20.

The holes 28 may also be filled during or after the molding process with a different material such as sodium chloride or other water- or liquid-soluble material, which dissolves upon contact with water or the other liquids likely to be encountered in a borehole 12. When the holes are so filled, better hydration of the liquid-swellable material of the disks 20 is sometimes achieved at a faster rate. In addition, the holes 28 may be filled with a water-swellable polymer which acts to fracture the disks 20 after they are in place in a stack in a borehole 12 and this action promotes a faster and more complete hydration of the liquid-swellable material in the main body of the disks.

For example, and as hereinafter described in more detail, sealing disks 20 both with and without filling material in the holes 28 have a capacity to double in size or volume when wetted in a borehole and within a relatively short period of time of approximately 15 minutes to 1 hour.

Referring to FIG. 1, when it is desired to seal-off a borehole 12 having an elongated steel well casing 10 therein at a particular level or region, a plurality of the liquid-swellable disks 20 are placed in succession above the upper end of the well casing 10 as shown and are permitted to drop and slide downwardly into the borehole 12 as indicated by the arrows A. The central hole 26 of the disks 20 are coaxially aligned on the well casing 10 which acts as a guiding element during downward travel of the disks into the borehole. The outer holes 28 and the grooves 25 in the edges of the disks 20 serve to permit air flow relatively upwardly from the bottom of descending disks as the disks pass downwardly on the well casing 10 toward the bottom of the borehole, and this results in less resistance to downward movement of the disks in the confined borehole.

The central hole 26 in each disk or sealing element 20, is dimensioned to provide considerable amount of inner clearance space IC between the inner surface of the hole and the outer surfaces of the well casing 10 so that each disk will move freely downwardly along the well casing 10 without hanging up. The amount of clearance IC is large enough to accommodate collars, protrusions and other obstructions that may be present on the well casing 10. The outer periphery 24 of each disk is chosen with a diameter that is less than the minimum diameter of the borehole 12 likely to be encountered so that the disks will not hang up because of engagement against a protruding wall portion of the borehole 12. As illustrated in FIGS. 3, 4, and 5, an internal clearance IC exists between the exterior surface of the well casing 10 and the internal surface of the central hole 26 of each disk 20 and an exterior clearance EC is established between the exterior surface 24 of each disk and the surrounding wall surface 23 of the borehole 12. As each succeeding sealing disk 20 is lowered into the borehole 12 on the central well casing 10, a stack of disks is formed and when a desired stack height is achieved at a preselected level in the borehole, other types of less expensive filler material may be poured into the borehole to reach a next level whereat a seal around the well casing as 10 desired. At this level, another stack of disks 20 of a desired height may be established. Also, the borehole 12 may be completely filled with disks 20 if desired and then sealed off at the top adjacent the earth's surface 14.

Referring now to FIG. 2, when a stack of annular sealing disks 20 has been assembled, substantially the entire space or volume 21 of the borehole 12 around the well casing 10 is filled, except for the voids established because of the clearances IC and ED. Subsequent contact of the disks 20 with water or other liquids in the borehole 12 causes the disks to swell and enlarge in radial directions to tightly engage the outer surface of the well casing 10 as shown, and also to expand radially outwardly to seal against the irregular surface 23 of the surrounding borehole 12. This swelling action substantially fills and seals-off the entire space or volume in the borehole 12 around the well casing 10 in a region where a stack of disks 20 is contained. After such sealing has occurred, water or other liquid from areas or regions 16 in the earth's strata, or flowing down the borehole 12 from the earth's upper surface 14 is sealed-off from contact with the well casing 10, and the interior of the casing 10 is also maintained free of liquid except for that liquid which might seep in or enter from the upper or lower end. If desired, additional granular bentonite material 29 may be poured downwardly into the interior of the well casing 10 from the upper end to form a swelled mound to seal off the lower end of the well casing as shown in FIG. 2.

A variety of liquid-swellable, gel or fluff forming materials may be utilized in the sealing disks 20 including solid bentonite clay, granular or powdered bentonite clay and the bentonite material may comprise calcium, sodium, and/or lithium bentonite. These materials may also be treated with quatenary amines to make the material suitable for absorbing organic and petroleum liquid. In addition, a suitable disk material may include a proportion of non-swellable fillers such as ordinary sand, silica sand, mica, diatomaceous earth and may also include a proportion of calcium stearate and/or a non-liquid-absorbing filler material. Up to as high as 75% filler material may be used in the disks 20 to prevent crushing of the well casing 10 when extremely wet conditions are encountered. Usually a minimum of 10% filler is provided to increase the porosity of the disks for absorption of moisture. In addition to the treatment of bentonite with quatenary amines, other treatments may be utilized for rendering the bentonite to be organophillic for absorbing different types of organic or petroleum fluids, likely to be encountered.

In a relatively dry state (10% to 30% moisture), the annular sealing disks elements 20 are relatively hard and solid and positively retain their basic shape even after contact with a liquid initially occurs. The disks or elements 20 can be packaged in discrete packages and as a number of disks are successively deposited down a borehole 12 to form a stack, the disks are counted so that a desired height or depth of a stack of disks 20 can be readily calculated before other types of fillers are poured into a borehole 12. For example, if a sealing zone 10 feet in depth is to be provided at a certain level in the borehole and if each annular sealing disk 20 has a dimension of 6 inches between opposite, parallel flat faces 22, a stack of 20 disks will produce a height of 10 feet as desired for the particular application.

Referring now to FIG. 6, therein is illustrated a borehole 12 having a capped-off well casing 10 therein which is especially adapted for use to monitor and measure the level of ground water or a water table level 30 which changes from time to time. The lower segment of the well casing 10 is provided with a well point 10A and a plurality of slots 11 are formed in a lower segment of the well casing to admit water from the surrounding strata below the level of the water table 30. Porous material 13 such as gravel, sand or other non-water-soluble material is introduced into the well casing to a particular level, normally spaced above any anticipated height that the water table level 30 might rise to. Above this depth of porous sand and gravel, however, it is desired to seal off the space or void between the well casing 10 and the adjacent wall of the borehole 12 to prevent casual water seepage from random openings 16 in the strata above the level of the water table.

To accommodate and provide such a seal, a plurality of appropriately sized, annular sealing elements or disks 20 of the character decribed hereinbefore, are deposited to move down the borehole 12 guided on the well casing 10 to fill the borehole space 21 for a predetermined distance above the bed of porous sand and gravel 13. After the borehole has been substantially filled as shown, any water leaking into the borehole at a level above the bed of porous sand and gravel fill 13 is initially absorbed by the liquid-swellable, bentonite material of the annual disks or sealing elements 20. The wetted sealing disks expand both radially outwardly and inwardly to tightly clamp around the well casing 10 and against the adjacent outer surrounding surface 23 of the borehole 12 as illustrated. Subsequently, any water or fluid tending to flow into the borehole 12 from the various formations, crevices or openings 16 in the earth or strata above the water table is blocked by the sealing action of the stack of annular sealing disks 20. Typically a well casing 10 adapted for use in sensing and recording changes in the level of a water table 30 is provided with a concrete cap 32 at ground level surrounding the upper end of the well casing 10 and a removable, well casing cap 34 is provided to seal the cap against the entry of casual water or rain from the upper end of the well casing.

For example, up to 15% of sand or sodium chloride may be used and up to 11% of sodium sulfate may be used as a filler to provide increased porosity for faster hydration of the liquid-swellable material. Sodium sulfate mixed with calcium bentonite and other fillers may also be used. In general, it is desirable that complete hydration of the water-swellable material be completed within 15 to 60 minutes after intitial contact of the disks 20 with water or other liquid in the borehole 12. Moreover, granular or powdered bentonite clay is used to provide for faster hydration than crude or green clay which has not been ground up or granulated.

Sealing disks 20 in accordance with the present invention having a volume of a selected size when in a relatively dry condition prior to installation in a borehole have been found to be capable of swelling to a volume double the original size within a time period of 15 minutes to 1 hour when encountering liquids in a borehole and these disks are thus especially advantageous in rapidly establishing a seal in a borehole 12 around a well casing 10 at a particular level in the borehole.

Figure 7:
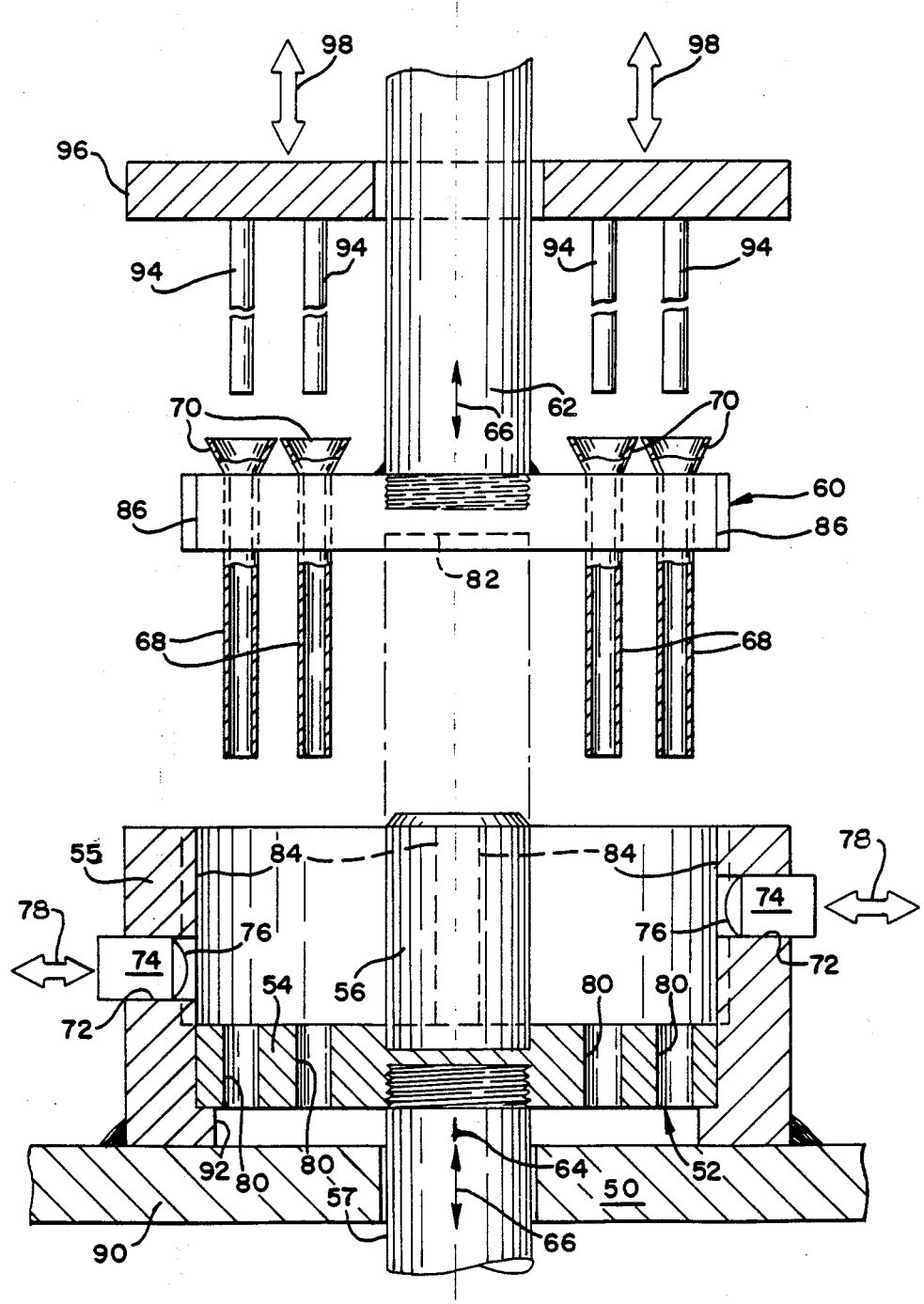
FIG. 7 is a vertical cross-sectional view of a mold used for making sealing elements or disks of the present invention and shown in an open position before filling with liquid-swellable material.

Referring now to FIG. 7, therein is illustrated a mold 50 used for making the sealing elements or disks 20. The mold includes a cup-shaped cope 52 having a circular bottom wall 54 and an upstanding cylindrical sidewall 55. A centrally located, upstanding cylindrical pin 56 for forming the central hole 26 in a molded disk 20 is mounted on the bottom wall 54 which, in turn, is mounted on the upper end of a lower piston rod 57.

The mold 50 also includes a disk-like drag or upper mold member 60 of circular shape mounted on the lower end of an upper piston rod 62 used for moving the drag up and down relative to the cope 52 along a central axis 64 during operation of the mold as indicated by the arrow 66.

A plurality of depending, thin-walled hollow tubes 68 are mounted on the drag disk 60 to form the passages 28 of the sealing disks 20, and the tubes 68 are arranged in a pattern around the central axis 64 to provide a preselected number of passages 28 in a completed sealing disk. The hollow tubes 68 are open at both upper and lower ends and the upper ends are provided with funnel-like portions 70 to facilitate filling the interior of the tubes 68 with water-soluble material and/or liquid-swellable polymer material during or after the molding operation.

The cylindrical sidewall 55 of the cope 52 is formed with a plurality of radial openings 72 arranged in a pattern around the periphery and each opening is provided with a radially movable piston 74 having a spherically-shaped inner end surface 76 for forming the dimples 27 in the outer peripheral surface 24 of the sealing disks 20. As indicated by the arrows 78, the pistons 74 are radially movable back and forth during a molding operation to provide dimples 27 of a predetermined depth in the sealing disks 20.

The circular bottom wall 54 of the cope 52 is provided with a plurality of cylindrical passages 80 arranged in a pattern and coaxially aligned with respective hollow tubes 68 on the upper drag disk 60. When the mold 50 is closed, lower end portions of the hollow tubes 68 are seated in the passages 80 to secure the tubes in place as pressure is increased on the material in the mold 50. The outer surface of the tubes 68 is covered with a coating of polytetrafluorethylene (TEFLON) which has an extremely low coefficient of friction to permit withdrawal of the tubes from a formed disk 20 of water-swellable material without damage to the molded disk. The lower surface or underside of the drag disk 60 is provided with a shallow recess 82 designed to accommodate an upper end portion of the central pin 56 when the mold 50 is closed to help maitain coaxial alignment between the cope 52 and drag 60.

The cylindrical sidewall 55 is also provided with a plurality of equilaterally spaced, inwardly projecting, vertical ribs 84 designed to cooperate with appropriately shaped and positioned vertical tracks 86 in the peripheral edge of the drag disk 60. As the drag disk 60 is moved downwardly into the cylindrical sidewall 55 of the cope 52, the ribs 84 are engaged within the grooves 86 of the drag disk 60 preventing relative rotation between the drag disk 60 and the cope 52 so that the lower ends of the hollow tubes 68 will be accurately aligned with the passages 80 in the bottom wall 54 when the mold is closed.

In a molding operation, a sheet of thin paper or the like, is placed on the bottom wall 54 of the cope 52 to cover the upper ends of the passages 80. The cope 52 is then filled with a predetermined amount of material and the upper drag disk 60 is moved downwardly into the cylindrical sidewall 55 of the cope 52 until the desired molding pressure on the material is obtained. During this time period the sidewall 55 is supported and attached on a solid base 90 and the bottom wall 54 is supported on an inwardly extending lip 92 provided at the lower end of the sidewall.

As the upper drag disk 60 moves downwardly toward the closed position, some of the material in the cope 52 enters the open lower ends of the hollow tubes 68. In order to remove this material, a plurality of push rods 94 carried on a vertically movable upper platen 96 and coaxially aligned with the hollow tubes 68 are moved downwardly to extrude the accumulated material out of the lower ends of the hollow tubes. The upper platen 96 is then withdrawn upwardly as indicated by the arrows 98 and the "TEFLON" coated tubes 58 leave smooth bore holes 28 in the pressure molded disk 20. Subsequently, the upper drag disk 60 is withdrawn upwardly from the lower cope 52 to open the mold as shown. The finished molded sealing disk 20 is then ejected from the mold 50, by upward travel of the bottom wall 54 on the piston rod 57. If required, the passages 28 in the molded disk 20 may be filled with water-soluble material or a liquid-swellable polymer to complete the operation while the formed disk is in the mold or after removal from the mold.

Referring now more particularly to FIGS. 8, 9 and 10, another embodiment of a liquid swellable sealing disk is illustrated and referred to by the reference numeral 120. The disks 120 are especially adapted for sealing and plugging abandoned boreholes 12 previously left open at the earth's surface 14 (FIG. 8) and/or for sealing and plugging underground piping such as pipes 140 and 142 having ends projecting outwardly or adjacent to the level or edge of the adjacent surface of the earth 14 (FIG. 10).

The disks or sealing elements 120 are formed of the same types of materials used for the disks 20 as previously described and are generally cylindrical in shape including parallel, flat, opposite surfaces 122 of generally circular shape bounded by a generally cylindrical, outer peripheral edge or side surface 124. Unlike the disks 20 of prior embodiments, the disks 120 have no central bore for accommodating a central well casing because the disks 120 are designed for plugging or sealing earthen boreholes 12 having no well casing remaining therein or for plugging and sealing hollow underground piping such as the pipes 140 and 142 which have portions extending underground.

The solid disks 120 are appropriately dimensioned in diameter and thickness to provide the needed external clearance EC between the periphery 24 and the adjacent wall surface 23 of the borehole 12 or the adjacent inside surface of the pipes 140 and 142 etc. As in the prior embodiments, the disks 120 are preferably provided with external grooves 125 equilaterally disposed around the perimeter 124 in order to facilitate movement of the disks into the borehole 12 and the pipes 140 and 142. The grooves 125 also initially help to pass liquid into the region occupied by successively deposited disks enployed in a stack forming a sealing plug in a pipe or uncased borehole.

Referring specifically to FIG. 8, an abandoned borehole 12 may require plugging and sealing at levels both above and below the intermediate level of a source of underground water 115 normally intersecting the abandoned hole 12. In order to avoid diversion of the underground water from its normal path through the earth beneath the surface 14 a lower sealing plug comprising a stack of liquid swellable disks 120 is established below the level of a bed of porous gravel 113, which bed permits an uninterrupted flow of underground water 115 across the borehole 12 as indicated. An upper stack of solid, sealing disks 120 is then established above the porous gravel bed 113 and the upper stack is closed off at the earth's surface 14 with a poured concrete cap 121. When liquid is encountered in the borehole 12, the disks 120 in each stack begin to swell and expand against the adjacent borehole wall surface 23 and the stacks then eventually become more or less permanent solid plugs or seals in the borehole above and below the level of the ground water 115 and gravel section 113.

Referring to FIG. 10, the vertical pipe section 140 is loaded with a number of solid sealing disks 120 which form a vertical plug or seal in the pipe 140 and a connecting tee 146. Water entering the tee 146 from an underground pipe section 148 causes the liquid swellable disks 120 within the tee 146 and pipe 140 to swell up against the inside surface of the pipe and wall of the tee to establish a water tight plug or seal. Disks may be deposited to fill the entire height of the pipe 140 if required but usually a good tight pipe plug can be established with only a few disks 120 of a size having a minimum clearance EC that is suitable for the size of the pipe involved. A removable pipe cap 150 may be provided to close off the upper end of the pipe 140 after the plug is established.

A horizontal plug or seal may be formed to supplement the vertical plug by the insertion of a number of liquid swellable disks 120 from the outer end of the horizontal pipe 142 before or after the initial vertical plug is established. The disks 120 may be inserted into the pipe 142 from an open outer end of the pipe and are then moved horizontally inwardly until contact is made with the disks 120 in the tee 146. Contact with liquid in the pipe 142 causes the disks to swell and form a horizontally extending cylindrical plug or seal so that liquids or gases from the underground pipe 148 do not escape to the atmosphere. A pipe cap 152 may be provided on the outer end of the horizontal pipe 142 if desired.

Although the present invention has been described in terms of several preferred embodiments, it is intended to include those equivalent structures, some of which may be apparent upon reading this description, and others that may be obvious after study and review.

What is claimed and sought to be secured by Letters Patent of the United States is:

1. An article of manufacture for sealing around an elongated casing extending into a borehole in the earth; comprising:
   an annular disk formed of relatively dry, compacted, liquid-swellable and absorbent, material including bentonite, said disk having a pair of generally flat, spaced apart, opposite faces and a central hole extended through said disk between said opposite faces, said hole having a cross-section greater than that of said casing, to permit said disk to be mounted on and move along said casing in guided, generally centered position thereon into said borehole;
   said disk having an outer periphery spaced radially outwardly around said central hole extending between said opposite faces outwardly of and smaller than said borehole for permitting said disk to move along said casing to form a stack of said disks thereon for substantially filling said borehole around said casing.

2. The article of claim 1, wherein said disk includes a plurality of passages spaced outwardly of said central hole extending between said opposite faces for permitting fluid to pass as said disk moves down into said borehole.

3. The article of claim 2, wherein:
   said passages of said disk are filled with sodium chloride or other water-soluble material.

4. The article of claim 2, wherein:
   said passages of said disk are filled with sand.

5. The article of claim 2, wherein:
   said passages of said disk are filled with a water-swellable polymer for fracturing said disk.

6. The article of claim 1, wherein:
   said liquid-swellable material is intermixed with a filler for creating pores so that fluids can penetrate into the interior of said disk.

7. The article of claim 1, wherein:
   said liquid-swellable material comprises 5% to 100% bentonite.

8. The article of claim 7, wherein:
   said liquid-swellable material is compacted under high pressure to form said disk.

9. The article of claim 1, wherein:
   said bentonite is treated to be organophillic for absorbing organic fluids.

10. The article of claim 1, including:
    a fluid previous fabric around said periphery and on said opposite faces for retaining said liquid-swellable material in the shape of said disk and permitting fluid contact therewith.

11. The article of claim 1, wherein:
    said liquid-swellable material includes bentonite selected from the group consisting of calcium bentonite,1 sodium bentonite, lithium bentonite and mixtures thereof and a non-liquid-absorbing filler.

12. The article of claim 11, wherein:
    said filler is selected from the group consisting of silica sand, mica, diatomaceous earth and mixtures thereof.

13. The article of claim 1, wherein:
    said liquid-swellable material includes calcium stearate.

14. The article of claim 1, wherein:
    said liquid-swellable material of said disk includes at least 10% moisture.

15. The article of claim 1, wherein:
    said liquid-swellable material of said disk includes 15% to 30% moisture.

16. The article of claim 1, wherein:
    said liquid-swellable material includes 15% to 20% moisture and is formed into said disk under pressure of up to 40,000 psi.

17. The article of claim 1, wherein:
    said liquid-swellable material of said disk comprises crude bentonite clay having a moisture content ranging up to 30% to 40%.

18. The article of claim 1, wherein:
    said liquid-swellable material of said disk inlcudes up to 15% moisture and a non-liquid-swellable filler of sand, sodium chloride or sodium sulfate.

19. The article of claim 1, wherein:
    said liquid-swellable material of said disk includes up to 11% moisture and a filler of sodium sulfate.

20. The article of claim 1, wherein:

said liquid-swellable material of said disk is capable of hydrating to double its size in 15 to 60 minutes.

21. The article of claim 1, wherein:

said liquid-swellable material of said disk includes a non-liquid-swellable filler ranging from 10% to 75% of the disk volume.

22. The article of claim 1, wherein said passages of said disk are filled with porous material.

* * * * *

UNITED STATES PATENT AND TRADEMARK OFFICE
CERTIFICATE OF CORRECTION

PATENT NO. : 4,919,989

DATED : April 24, 1990

INVENTOR(S) : Robert V. Colangelo

It is certified that error appears in the above-identified patent and that said Letters Patent is hereby corrected as shown below:

IN THE TITLE:

The title should read:

Front page line 2, "CASTINGS" should be --CASINGS--.

Signed and Sealed this

Sixteenth Day of July, 1991

Attest:

HARRY F. MANBECK, JR.

Attesting Officer

Commissioner of Patents and Trademarks